Jan. 9, 1968   JW HAMBY ETAL   3,362,584
METERING DEVICE FOR GRANULAR FLOWABLE MATERIAL
Filed March 10, 1966   4 Sheets-Sheet 1

JW HAMBY
FRANKY D. MILLS
INVENTORS

BY
Wayland D. Keith
THEIR AGENT

Jan. 9, 1968  JW HAMBY ETAL  3,362,584
METERING DEVICE FOR GRANULAR FLOWABLE MATERIAL
Filed March 10, 1966  4 Sheets-Sheet 2
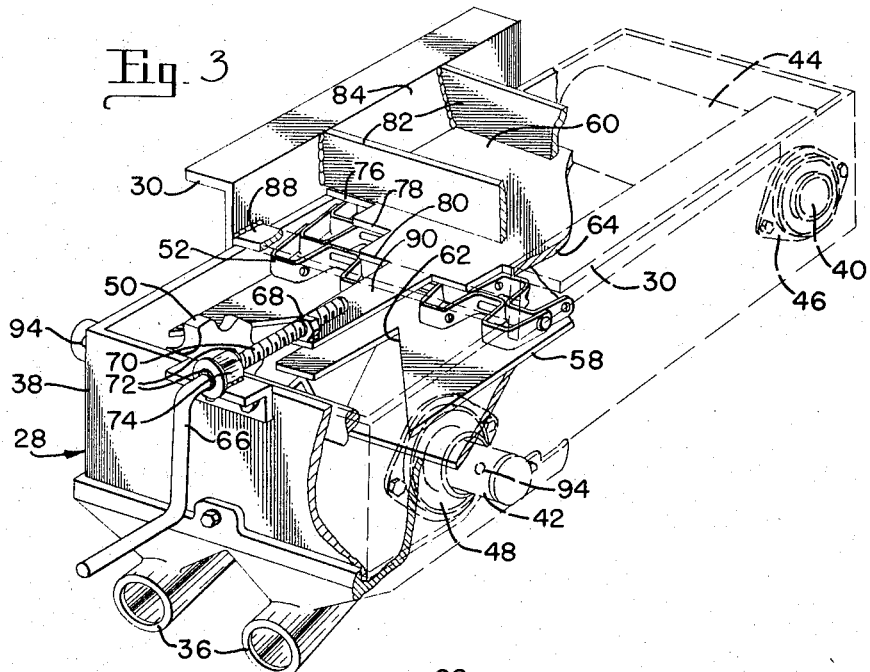
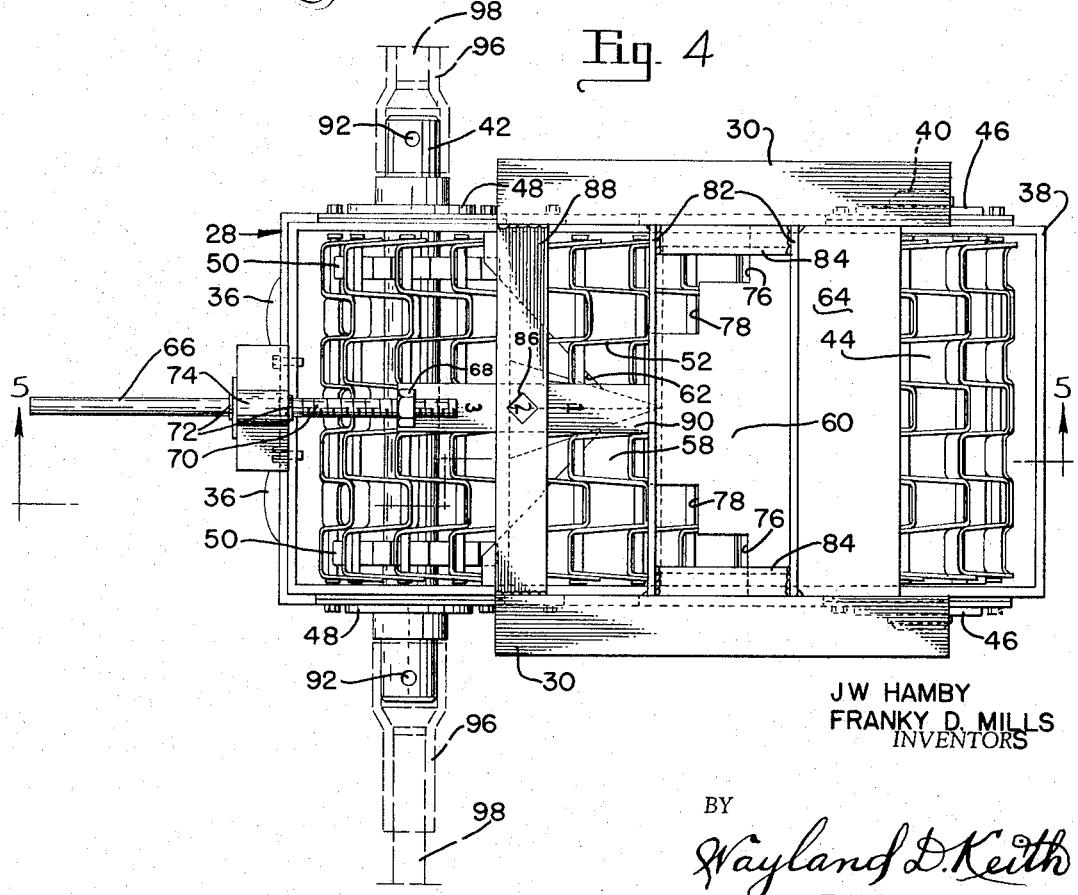
JW HAMBY
FRANKY D. MILLS
INVENTORS
BY
Wayland D. Keith
THEIR AGENT

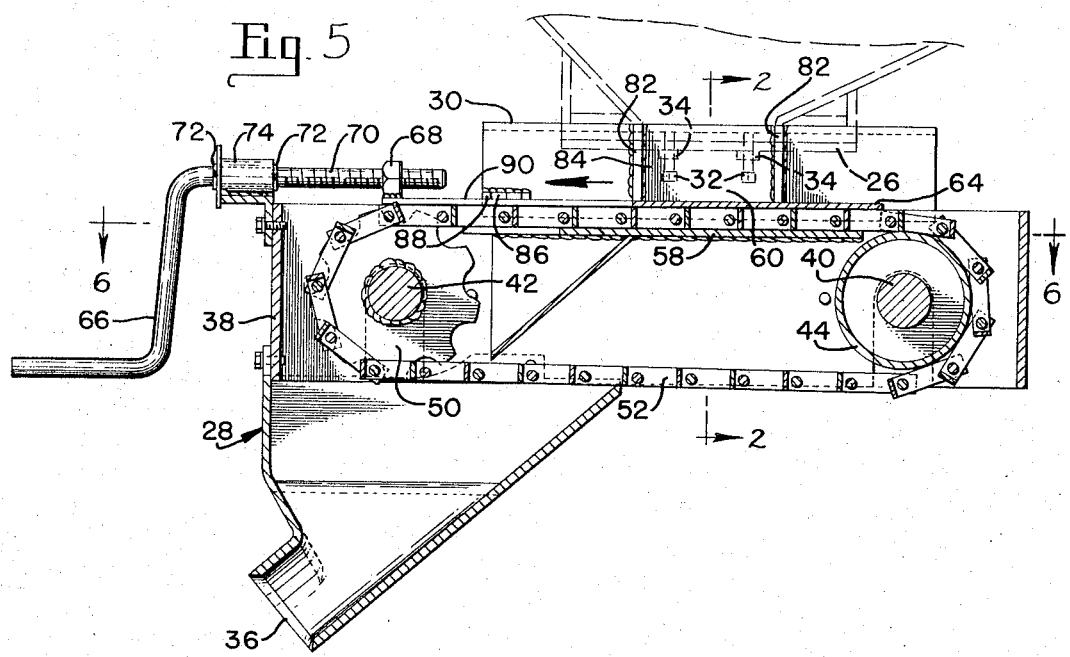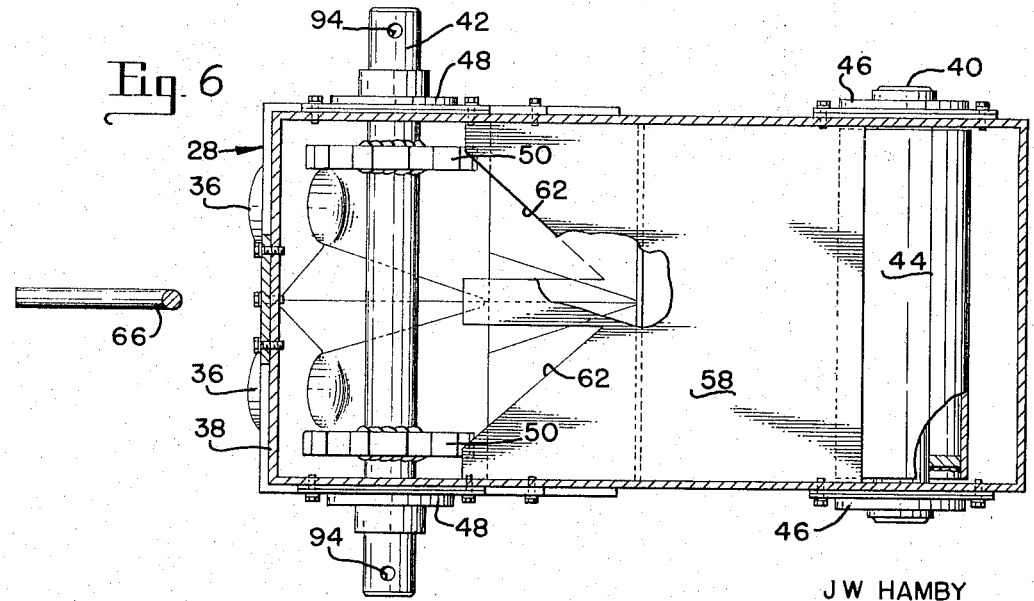

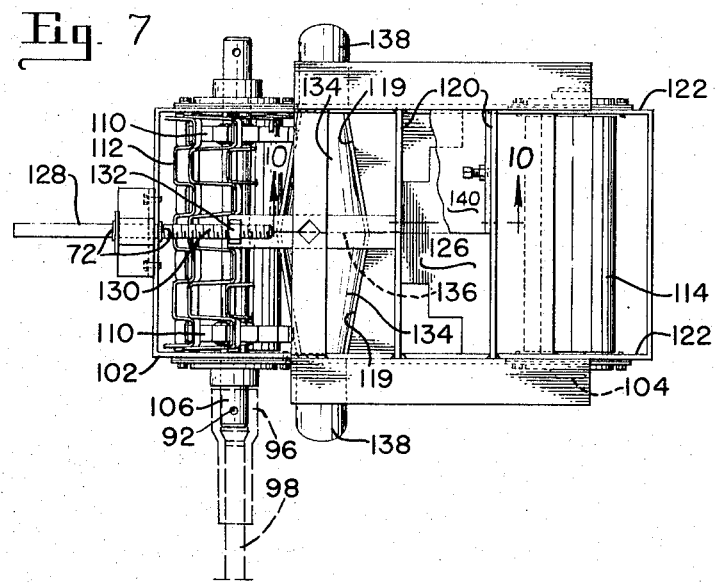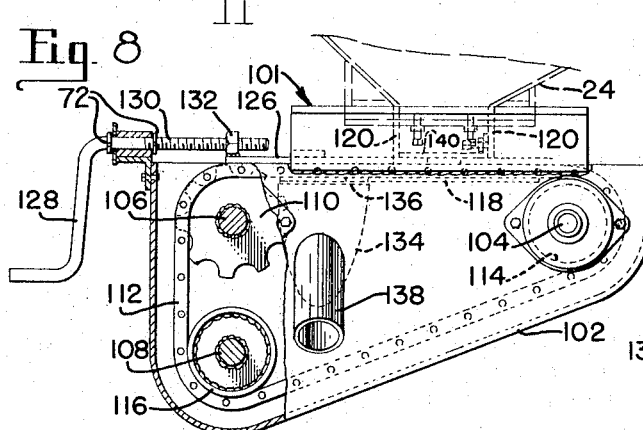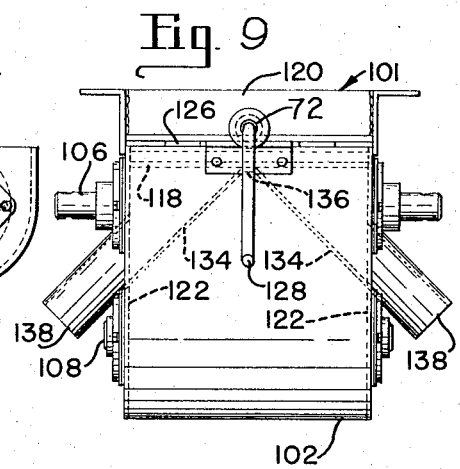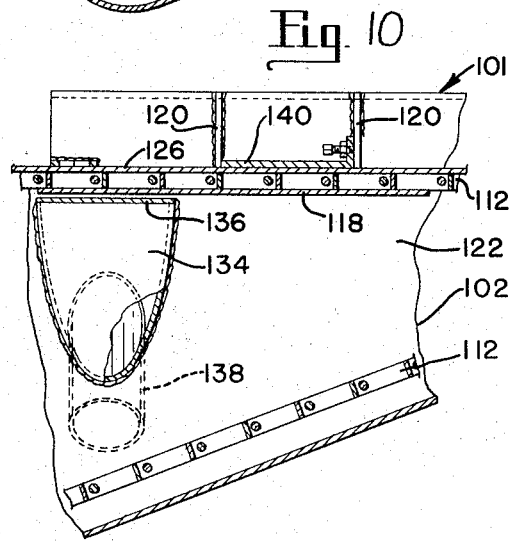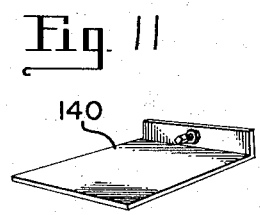

3,362,584
METERING DEVICE FOR GRANULAR
FLOWABLE MATERIAL
J W Hamby and Franky D. Mills, Plainview, Tex., assignors to The Hamby Company, Plainview, Tex., a corporation of Texas
Filed Mar. 10, 1966, Ser. No. 533,142
6 Claims. (Cl. 222—49)

ABSTRACT OF THE DISCLOSURE

A metering device for dispensing selected, measured amounts of granular, flowable material and/or soil treatment materials, insecticides and the like, which device can be attached to and used in conjunction with a conventional planter. Provision is made for regulating the dispensing of granular material or the like, and for closing or adjusting the dispensing openings, selectively, thereby changing the dispensing capacity, as well as the number of materials to be dispensed. The endless metering chain which receives material from hoppers does not readily become clogged and is easily installed and operated.

---

This application is co-pending with application Ser. No. 401,812, of William D. Beasley, filed Oct. 6, 1964, for Metering Device for Granular Material, now Patent No. 3,258,162 which application is of common ownership, by assignment, with the present application.

This invention relates to improvements in metering devices, and more particularly to removable metering devices for metering a predetermined amount of dry, granular material, powdered material, or smooth type seeds, in accordance with a predetermined linear movement of an endless, perforate dispensing mechanism.

Various metering units have been proposed heretofore for dispensing dry, granular material, seeds and powdered material, but these, for the most part, utilized attachments for chains and the like, to drag the material out of the discharge end of a dispenser.

The present device utilizes a chain-like member, with open, ladder-like compartments, which chain-like member is so constructed as to dispense minute quantities of granular material, or seeds having smooth surfaces or pellets directly therethrough, within the range and capabilities for which the dispensing mechanism is designed to operate. This device is so constructed that, with or without varying the lineal speed of the dispensing mechanism or of the tractor, a metered amount of material may be varied from one unit of measure to many times that amount, within the minimum and maximum capacity of the machine, and by varying the speed of the chain, a still greater range in the amount of material dispensed may be had.

An object of this invention is to provide a metering device which will handle one type of material, or which will simultaneously dispense more than one type material as the lineal dispensing mechanism is moved beneath respective hoppers.

Another object of the invention is to provide a metering device which will dispense several dry, granular type materials, one type of material from each hopper, while the mechanism is passing over the terrain.

Still another object of the invention is to provide a metering device for attachment to a planter or the like, which, by simple adjustments, will meter a few pounds per acre up to several thousands pounds per acre.

Yet another object of the invention is to provide a metering device which may be minutely regulated to plant from a few pounds per acre up to several bushels per acre of seeds, which will flow by gravity from a hopper.

A further object of the invention is to provide a device which will meter dry insecticides from a hopper into the plant root zone, while the seeds are being planted, so as to provide the plants, which grow from the seed, with a systemic poison, which will be a deterrent against insects and rodents, which might otherwise destroy the plants as they emerge from the seed.

Still another object of the invention is to provide a metering device to meter, into plant rows as the seed is planted, dry chemicals for the control of weeds, and to direct fertilizer and/or insecticides into the furrow, or to broadcast such materials simultaneously with the movement of the metering device over the terrain.

Still a further object of the invention is to provide a movable, endless, perforate, cellular member into which granular material is dispensed, through an opening of predetermined size, to give a measured amount of granular material thereinto to be dispensed therefrom.

Still another object of the invention is to provide a graduated regulating device which will control the size of an opening of a discharge chute, from a closed condition to the maximum capacity of the discharge thereof.

A further object of the invention is to provide a metered dispensing mechanism which is quickly detachable from an agricultural implement, which enables the replacement of the mechanism in a minimum of time by the interchange, with a complementary unit, thereby obviating the necessity for closing down the planting operation.

Still another object of the invention is to provide a removable metering device, which metering device has a self-contained regulating mechanism associated therewith, so that one metering device may be removed and another substituted therefor, to give different steps of regulation in dispensing the material, either due to the thickness of the dispensing chain or the area size of the dispensing receptacles formed therein.

Another object of the invention is to provide a dispensing mechanism with a removable metering device which has a stepped metering plate operating longitudinally of the chain, which plate is self-contained on the metering device.

Yet another object of the invention is to provide a metering device which has a self-contained meter setting indicia to enable accurate regulation of the amount of granular material dispensed.

A further object of the invention is to provide a removable metering device which has slide members to complementally engage members on the dispensing mechanism, which metering device is so constructed that it may be inserted into place or removed by the removal of a minimum number of connecting elements.

Yet a further object of the invention is to provide a dual metering unit, with a single adjustment device, whereby the granular material will be dispensed into two outlets, simultaneously.

Yet a further object of the invention is to provide a dual metering unit for dispensing granular material into two outlets, means being provided to enable the blanking out of one of the dispensing units of the dual unit, when the use of only one unit is required.

Still another object of the invention is to provide a dual metering unit, the granular material which is dispensed therefrom will pass through only one of the metering chains.

Yet another object of the invention is to provide a metering device which is simple in construction, easy to regulate, relatively trouble free in operation, and which is low in the cost of manufacture.

With the foregoing objects in mind, and others which will become manifest as the description proceeds, reference is to be had to the accompanying drawings, in which like reference characters designate like parts in the several views thereof, in which:

FIG. 3 is a perspective view of one of the granular dispensing mechanisms shown apart from the hopper, parts thereof being broken away, parts being shown in section, and other parts being shown in phantom, in dashed outline;

FIG. 4 is an enlarged top plan view of the dispensing mechanism shown apart from the hopper, and showing the manner in which adjustments of the dispensing mechanism may be made;

FIG. 5 is a sectional view taken on the line 5—5 of FIG. 4, looking in the direction indicated by the arrows;

FIG. 6 is a sectional view taken on the line 6—6 of FIG. 5, with certain parts having been removed, and other parts being shown broken away to bring out the details of construction;

FIG. 7 is a top plan view of a modified form of dual metering unit, with parts broken away, with an alternate position of the metering plate shown in dashed outline;

FIG. 8 is a side elevational view of the modified form of dual metering unit shown apart from the agricualural implement for dispensing granular material, with parts broken away and shown in section to bring out the details of construction;

FIG. 9 is an end elevational view of the modified form of the dual metering mechanism, with a portion of the agricultural implement for dispensing granular material, shown in dashed outline, as associated therewith;

FIG. 10 is a fragmentary sectional view taken on the line 10—10 of FIG. 7, looking in the direction indicated by the arrows, and showing a blank-out plate secured in place; and FIG. 11 is a perspective view of a blank-out plate, shown apart from the device.

Figure 1:
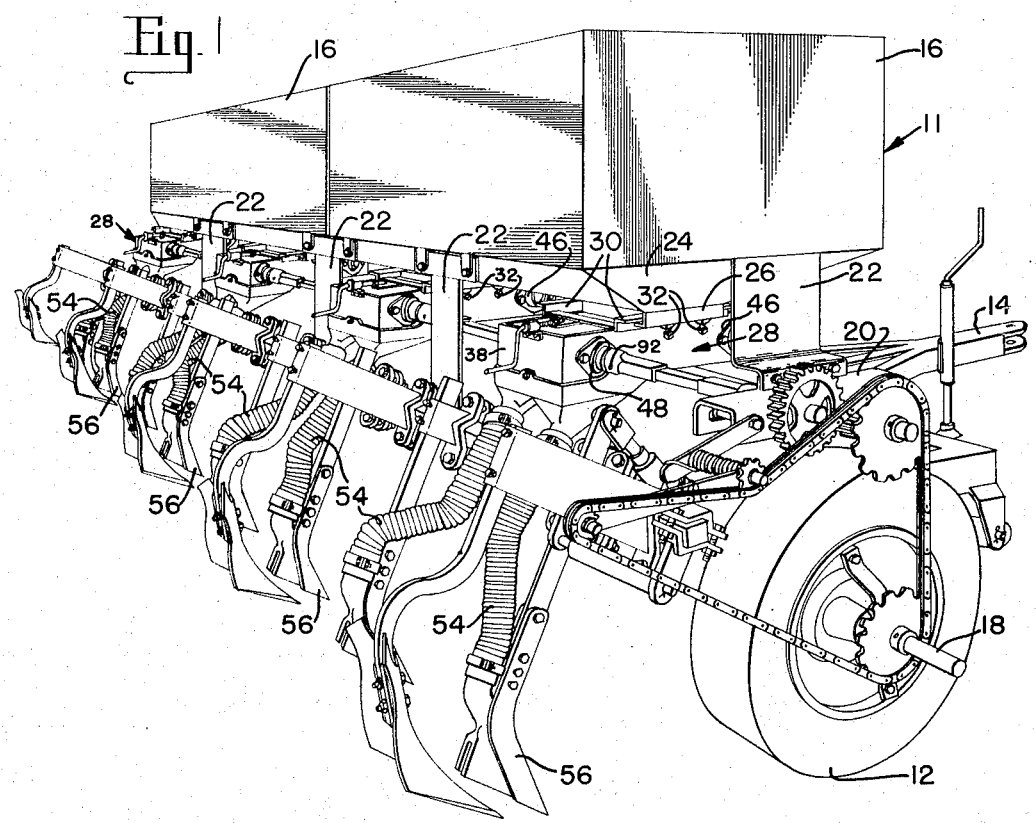
FIG. 1 is a perspective view of a device for dispensing granular material, which device has a plurality of hoppers for dispensing pulverulent or granular materials and/or seed therefrom simultaneously with the movement of the device over the terrain, by the metering units, showing dispenser chutes leading from the removable metering units.

With more detailed reference to the drawing, the numeral 11 designates generally a mechanism for dispensing granular fertilizer, pesticides, herbicides, fungicides and the like. The present device is mounted on a pair of axially aligned wheels 12 for movement over the terrain. A conventional tractor may be connected to hitch tongue 14 for towing the device over the terrain, as is well known in the art of agricultural implements.

A plurality of hoppers 16 are mounted on the frame 20 of the device, along the length of the axle 18, and are secured to the frame 20 by means of brackets 22.

Figure 2:
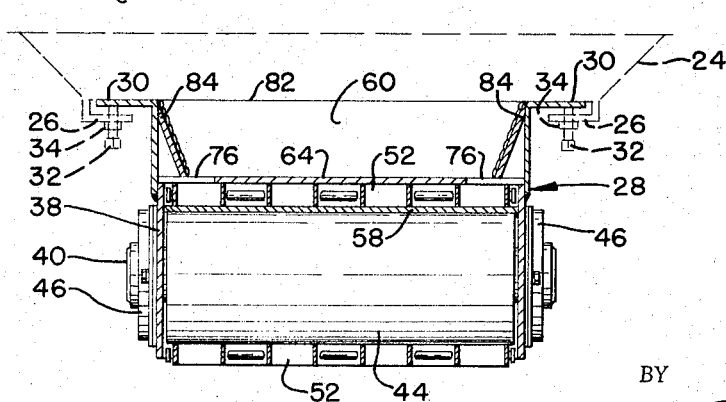
FIG. 2 is a sectional view taken on the line 2—2 of FIG. 5, looking in the direction indicated by the arrows.

Each hopper 16 converges downwardly, and the hoppers are spaced apart to form chutes 24, as will best be seen in FIGS. 1 and 2. The lower end of each chute has inturned lips 26 on opposite sides at the lower end thereof, as will best be seen in FIGS. 1 and 2, to slidably receive a removable, dual metering device, designated generally at 28. The dual metering device has out-turned flanges 30, to be slid into place in interengaged relation so that the removable, dual metering device 28 will occupy a position directly beneath the respective chutes 24, whereupon, set screws 32, which are screwthreaded into nuts 34, which nuts are welded or otherwise secured to the lower side of in-turned lips 26, will be tightened so that the set screws 32 will be in binding engagement with the out-turned flanges 30 of the removable, dual metering device 28.

Each removable metering device 28 is preferably made for dual use, that is, each has a pair of outlet necks 36 which forms openings in the lower side thereof, which outlet necks are at the lower apex of each discharge opening, as will best be seen in FIGS. 3 and 5, so the granular material, which passes out of the respective hoppers 16, will flow through the metering device 28 and to the lowest point of the housing thereof and out through the respective outlet necks 36.

The mechanism 11, for dispensing granular material, is very much of the general character of the dispensing mechanism shown in co-pending application Ser. No. 401,812, of William D. Beasley, Metering Device for Granular Material, filed October 6, 1964, over which the present invention has certain improved characteristics, and which applications are of common ownership.

The present removable, dual metering device 28 has a housing 38 which is substantially rectangular in form and has a pair of spaced apart shafts 40 and 42 journaled therein transversely thereof. The shaft 40 has a roller member 44 secured thereon, with bearings 46 journaling the shaft 40 for rotary movement. The shaft 42 is journaled within bearings 48 to enable shaft 42 to rotate freely therein. The shaft 42 has a pair of spaced apart sprocket-like members 50 secured thereon, which sprocket-like members 50 engage in driving relation with a ladder-like dispensing chain 52, as will best be seen in FIGS. 4 and 5. The ladder-like dispensing chain 52 is so constructed that, when moved horizontally over a member having a plane surface, conveyor pockets are formed, which, when dry, pulverulent or granular material is entrapped therein on the upper plane surface thereof, the material is conveyed thereby, with each pocket containing a measured amount of material, as is more fully brought out in the above-mentioned co-pending application. The material is moved by the dispensing chain 52 so as to discharge the material through outlet necks 36 so it may be conveyed through adjacent pairs of ducts or conduits 54, so as to direct the material downward to a point immediately rearward of plow 56 to perform the necessary function of fertilizing, or otherwise treating the soil in accordance with the granular or pulverulent material used.

The present removable, dual metering device has a first plane plate 58 which extends a spaced distance along the upper portion of the housing 38 so as to present a plane horizontal surface immediately below dispensing chain 52. The first plane plate 58 is immediately below the outlet opening 60 at the lower end of each hopper 16. The first plane plate 58 has an angulated cut on each side thereof toward the dispensing end thereof, as indicated at 62, for the purpose of distributing the material being dispensed by the movement of the ladder-like dispensing chain 52 in the direction indicated by the arrow in FIG. 5.

A second plane plate 64, which forms a step-cut metering plate, is positioned immediately above the ladder-like dispensing chain 52, which step-cut metering plate 64 is movably mounted above the upper face of dispensing chain 52 for longitudinal movement thereof by a crank and screw mechanism 66, the screw 70 of which threadably engages a screwthreaded nut 68, which is secured to a tongue 90 secured to the outer end of step-cut metering plate 64. The screw 70 of the screw mechanism 66 is fixed against longitudinal movement with respect to housing 38 by anchor rings 72 which are in contact relation with each end of a sleeve 74 which is secured to the housing 38.

The movable metering plate 64 is step-cut, as will best be seen in FIGS. 3 and 4, so upon moving the plate longitudinally by turning the screw 70, the steps 76, 78 and 80 will uncover one, two or three compartments of the dispensing chain 52 on each side of the center of movable metering plate 64, whereupon, when these openings made by the step-cuts on the plate 64 are between upright bars 82, material will be metered out through outlet opening 60 of the hopper and into the area confined between upright bars 82 and side walls 84 of the metering unit housing 38, so the material in this area will be moved by movement of the ladder-like dispensing chain 52 in the direction indicated by the arrow in FIG. 5. Thereby, the granular or pulverulent material will be dispensed onto the terrain in metered amounts, in accordance with the setting of the step-cut metering plate 64, as will be evident by an indicia number on the tongue 90 within opening 86 in a transverse bar 88 mounted on the housing 38 immediately above the elongated tongue 90. In this manner the particular amount of material, in accordance with a predetermined table, can be calculated as to how much material will be dispensed to an acre.

It is to be pointed out that the removable, dual metering device 28 may be used either in the dual form thereof or as a single metering device, as will be more fully brought out hereinafter. The metering device 28 has a shaft 42 which extends through each side thereof, and to remove the metering device 28 from the implement for dispensing granular material, the set screws 32 may be loosened, and with the flexible ducts or conduits 54 removed from outlet necks 36, pins or bolts 92 may be removed from holes 94 in shaft 42, so that the quick detachable couplings 96, on each side of the metering unit, may be disconnected, and with these moved axially on shaft 98 so as to be out of engagement with shaft 42, the unit may be slid outward from between in-turned lips 26, and speedily replaced with another unit, as desired, by the reverse procedure.

*Modified form of invention*

FIGS. 7 through 11 disclose a modified form of the invention of a dispensing meter which is adapted to be interchanged with the aforementioned form of invention; however, this modified form of the invention is so constructed that fertilizer or granular material is dispensed in metered amounts by the upper reach of an endless, open-mesh chain operably mounted in a removable metering unit.

The material is dispensed into the chain 112 from a chute 24 with the material being directed outwardly from the chute 24 into the metering device generally designated by the numeral 101. The metering device 101 has a housing 102 in which shafts 104, 106 and 108 are journaled in transverse parallel relation in bearings mounted in the housing 102. The shaft 106 has roller-like, toothed sprockets 110 thereon and fixedly secured thereto which sprockets are spaced apart longitudinally to receive a ladder-like, open-mesh conveyor chain 112. The chain 112 is similar to the open-mesh, ladder-like chain in the aforementioned form of invention. The shafts 104 and 108 each have rollers 114 and 116 thereon over which the chain 112 runs to hold the chain in taut relation. A plane plate 118 underlies the chain 112 so the granular material passing downward from chute 24 into a compartment formed between upright bars 120, and the walls of housing 102 permit the granular material to spread outward between the walls 122 which go to make up the detachable metering structure 101.

The metering unit has a step-cut plate 126, the steps of which are adapted to register with the respective parallel rows or receptacles in the ladder chain so, when in one position, all the rows of the receptacles in the open-mesh ladder chain will be filled with granular material, and when in another position, certain rows will be filled, and when in still a further position, the feed of granular material will be cut-off from the chain having receptacles therein. The plate may be moved longitudinally relative to the housing of metering device 101 by crank 128 and screw combination 130, which screw threadably engages a nut 132 to accomplish the regulation of step-cut plate 126 with respect to the opening formed between bars 120 and the chain 112. The plate 118 extends forwardly and has an angulated end 119 thereon so that the material that passes through the openings in step-cut plate 126 and into the receptacles in chain 112 will be directed into a receptacle 134 which slopes downwardly and outwardly from an apex 136 and directs the granular material into outlet necks 138 and, thence, downward through a hose similar to hoses 54 in the aforementioned form of the invention to deposit the granular material rearwardly of a freshly opened furrow which is opened by a plow 56.

The shaft 108 is spaced a distance below shaft 106, which shafts space the upper reach and the lower reach of chain 112 a spaced distance apart. This arrangement enables receptacle 134 and neck 138 to be directed outward between these reaches of the chain without the granular material being dispensed having to feed through the open-mesh chain twice. This particular arrangement minimizes clogging of the chain and insures the operator thereof the greatest efficiency. This form of the invention is, otherwise, provided with the same adjustments and is interchangeable with and operates in the same manner as the aforementioned form of the invention. The shaft 106 is coupled in driving relation with a shaft 98 by a coupling 96 and pins 92 in the same manner as the aforementioned form of invention.

When it is desired to use only half the capacity of the metering device, that is, one portion of the dual unit, a "blankout" plate 140 is placed above one-half of plate 126 so the plate 140 is between the upright bars 120. This will blank out or prevent the granular material feeding from chute 24 onto the plate 126 and through chain 112; thereby, one-half of the dual metering device may be utilized, while the other half thereof is not.

While the invention has been described and shown in two forms thereof, it is to be understood that changes may be made in the details of constructions without departing from the spirit of the invention or the scope of the appended claims.

Having thus clearly shown and described the invention, what is claimed as new and desired to be secured by Letters Patent is:

1. A device for metering granular, flowable material in proportion to the linear movement of a wheeled carriage, which metering device comprises:
   (a) a drive member,
   (b) a receptacle forming a chamber mounted on the wheeled carriage,
      (1) said receptacle having an opening formed in the bottom thereof,
   (c) a metering element detachably fitted, in sliding relation, on the bottom of said receptacle in position to cover the opening thereof,
      (1) said metering element having a housing,
      (2) said metering element having a plate movably mounted therein, below the bottom opening of said receptacle,
      (3) said metering element having an open mesh, endless, dispensing chain movably mounted thereon so as to be below said plate to dispense granular material therethrough,
      (4) said movable plate being step-cut within the length thereof,
      (5) said plate being movable to close said opening when in one position, and to control the size of the opening when in other positions,
   (d) actuator means connected to said movable plate to move said plate longitudinally of said chain a predetermined amount to regulate the opening in said receptacle,
      (1) said housing of said metering element having at least one outlet opening formed therein through which said granular material is dispensed by said dispensing chain,
      (2) indicia associated with said plate and with said metering element to indicate the amount of material dispensed through said opening in said receptacle and through said step-cut plate, upon linear movement of the wheeled carriage, (e) spaced apart roller members journaled in said housing of said metering element to receive said dispensing chain therearound,
   (1) at least one of said roller members having teeth formed about the periphery thereof, said teeth being engageable with said dispensing chain to move said dispensing chain with respect to said plate,
      (i) said toothed roller member being connected in driven relation with said drive member,
(f) a transverse bar mounted in the housing of said metering element, which transverse bar is positioned to be a spaced distance above said open mesh, dispensing chain, so as to wipe surplus granular material from the upper face of said dispensing chain.

2. A device for metering granular, flowable material as defined in claim 1; wherein
(a) said receptacle has a lip formed around the opening thereof,
(b) the housing of said metering element having a lip formed thereon, which lip is complementally engageable with the lip formed around the opening of said receptacle,
(c) fastening means securing said metering element housing and said receptacle against relative movement.

3. A device for metering granular flowable material as defined in claim 1; wherein
(a) said step-cut plate is so positioned as to be parallel with the upper surface of said dispensing chain.

4. A device for metering granular, flowable material as defined in claim 1; wherein
(a) said metering element has a further plate removably positioned intermediate the sides thereof above the upper surface of a portion of said step-cut plate, to blank out delivery of the granular, flowable material therethrough onto said dispensing chain.

5. A device for metering granular, flowable material as defined in claim 1; wherein
(a) said housing of said metering element comprises,
   (1) side walls,
   (2) further walls within said housing arranged longitudinally thereof and converging to an apex, which apex lies in a vertical, medial plane passing longitudinally through said housing,
(b) said movable plate, having step-cuts therein, on each side of said vertical, medial plane passing longitudinally through said housing so as to enable granular, flowable material to be directed through said step-cut portion in said plate in regulated amounts to and through openings in said open mesh dispensing chain,
(c) a neck on each of two sides of said housing of said metering element, each neck having an outlet opening formed therein, the necks extending outwardly on opposite sides of said vertical, medial plane passing longitudinally through said housing, and
(d) said actuator means adapted to move said movable plate to simultaneously regulate the dispensing of granular material from said receptacle onto said open mesh, dispensing chain to be directed outwardly through the respective openings in said necks.

6. A device for metering granular, flowable material as defined in claim 5; wherein
(a) said open mesh dispensing chain has spaced apart upper and lower reaches,
(b) said necks being positioned on said housing, so as to be in communication therewith, between the upper and lower reaches of said open mesh dispensing chain so as to divert granular material passing through said upper reach of said open mesh dispensing chain outwardly through said necks.

References Cited

UNITED STATES PATENTS

| | | | |
|---|---|---|---|
| 1,072,823 | 9/1913 | Cherry | 222—330 |
| 2,090,525 | 8/1937 | Carrier et al. | 222—330 X |
| 2,619,261 | 11/1952 | Pick et al. | 222—371 |
| 2,741,401 | 4/1956 | Kehres et al. | 222—310 X |
| 3,201,006 | 8/1965 | Bernhardt | 222—330 |
| 3,258,162 | 6/1966 | Beasley | 222—41 |

ROBERT B. REEVES, *Primary Examiner.*

KENNETH N. LEIMER, *Examiner.*